Oct. 15, 1963 J. F. BAXA 3,106,953
PROTECTIVE DEVICE FOR TIRES AND TUBES
Filed Nov. 1, 1961
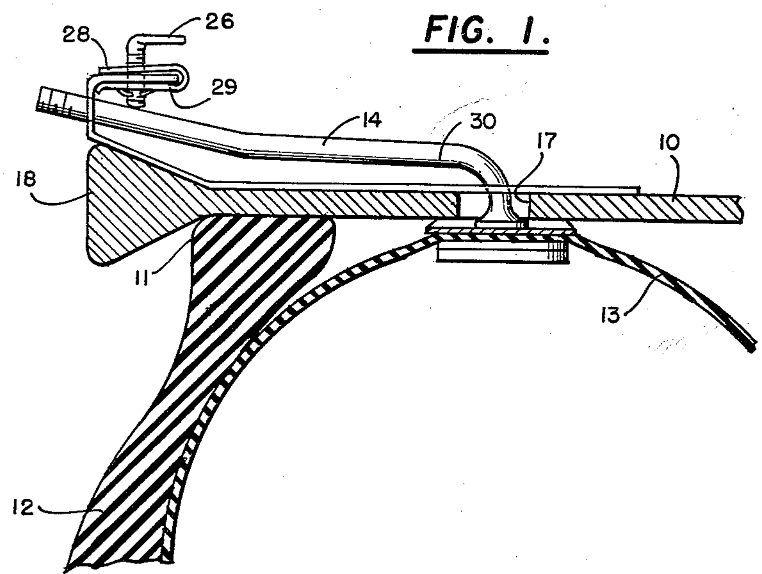
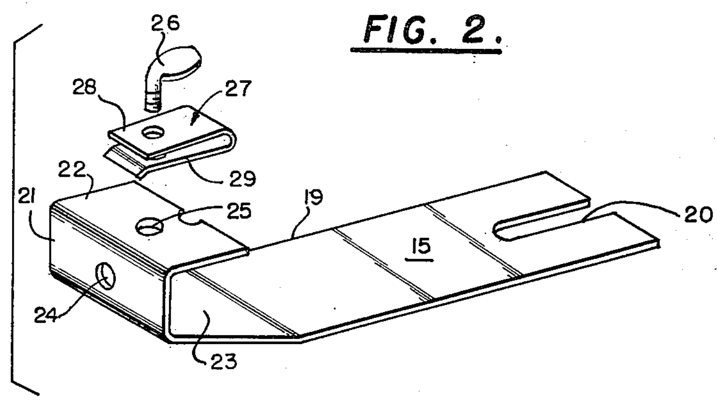
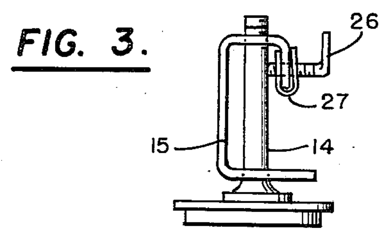
INVENTOR.
James F. Baxa
BY Moore & Hall
ATTORNEYS United States Patent Office 3,106,953
Patented Oct. 15, 1963

3,106,953
PROTECTIVE DEVICE FOR TIRES AND TUBES
James F. Baxa, National Road W., St. Clairsville, Ohio
Filed Nov. 1, 1961, Ser. No. 149,269
3 Claims. (Cl. 152—427)

This invention relates to a protective device for tires and tubes on vehicles, and more particularly pertains to a device which is fastened to the valve stem of a tire or tube and which prevents the valve stem from being drawn through the rim in the event of a flat tire or a blowout, thereby avoiding damage to the tube and/or tire casing.

It frequently appears that when a tire on a moving vehicle is suddenly deflated, an extremely large force is exerted upon the tire stem before the vehicle can be brought to a stop, and this force may be so great that the stem is forcibly pulled inwardly through the aperture. Damage to the valve stem results, but an effect of even greater significance is that the presence of the valve stem within the tire casing often produces great damage to the tire casing and to the tube so that both may be ruined beyond repair before the vehicle is brought to halt.

It is, therefore, an object of the present invention to provide a device which may be affixed to a protruding valve stem in a convenient manner and which will positively prevent the stem from being drawn through the aperture in the rim.

It is a further object of this invention to provide a device which readily fits about a tire stem and can be conveniently fastened in place so that it prohibits withdrawal of the stem into the tire casing in the event the vehicle is operated with the tire deflated.

Other objects, purposes, and characteristic features of the invention will, in part, be obvious from the accompanying drawings and, in part, pointed out as the description of the invention progresses.

In describing the invention in detail, reference will be made to the accompanying drawing in which like reference characters designate corresponding parts in the several views and in which:

FIGURE 1 is a sectional view showing the device of the present invention as it is used on a tire stem and showing also its relationship with respect to the rim, tire casing and tube; and FIGURE 2 is an exploded perspective view of the device of this invention; and FIGURE 3 is a view of a modified form of the invention.

FIGURE 1 is a sectional view which illustrates a portion of a tire rim 10 against which is fastened the bead portion 11 of a tire casing 12. Only one side wall of the casing is shown, and it will be underderstood that the other side wall is of the same shape and also has an upper bead which abuts the rim 10 on its other side (not shown). Within the confines of the volume enclosed by the rim 10 and tire casing 12 is a tube 13. A valve stem 14 communicates between the tube interior and the outer atmosphere and a valve (not shown) is positioned within that end of the stem 14 which is nearest the atmosphere. The stem 14 extends through an aperture 17 which is defined in the rim 10. When the tire and tube are of the heavy-duty type which are normally used on large vehicles such as trucks and the like, the valve stem ordinarily makes substantially a right-angle bend upon passing through the aperture 17. This is done so that the stem may extend outwardly beyond the outer edge 18 of rim 19 so that its free end is readily accessible in order that air may be admitted to or removed from the tube.

In the event that the vehicle is operated with the tire in a deflated condition, the violent flexing and distortion of the side walls of the tire create exceedingly large forces which pull upon the tube and are often ordinarily able to wrench the stem 14 out of position and forcibly pull it within the tire casing. As can be seen from FIGURE 1, this may well require that the stem 14 be bent out of shape as by removing the right-angle bend therein since otherwise the stem is not likely to pass through the aperture 17. Nevertheless, the forces involved are so great that this readily happens so that the stem is damaged. Moreover, as already mentioned, much greater damage occurs thereafter since the stem is then able to cause considerable damage by tearing the tube and by puncturing the tire casing as the vehicle continues to move with the tire deflated.

The device of the present invention is shown as it is intended to be used in FIGURE 1, and is also shown in an exploded perspective view in FIGURE 2. The device comprises in general a metallic plate 15 which is adapted to fit about a tire stem, together with a means for securely fastening the plate to the stem. More specifically, plate 15 has a substantially flat portion 19 having a slot 20 defined in one end thereof. When the device is intended to be used in conjunction with a rim having an upwardly extending portion as at 18 in FIGURE 1, then plate 19 has its portion 23 bent slightly upwardly with respect to portion 19 so that it will clear the portion 19. A further bend is made in plate 15 to thereby provide an upstanding wall portion 21 which will be substantially perpendicular to the axis of stem 14. This wall 21 defines an aperture 24 which receives stem 14 when the device is in place as shown in FIGURE 1. A further bent-over end portion 22 is provided which lies in a plane substantially parallel to the axis of stem 14. Another aperture 25 is defined in the portion 22 for receiving wing screw 26. The aperture 25 may be threaded so as to engage the threads or screw 26. Preferably, however, a speed nut 27 is provided as in FIGURES 1 and 2 having opposing surfaces 28 and 29 which fit about the upper and lower surfaces of portion 22. Such speed nuts are well known and make it possible for the wing nut 26 to be threadably engaged with respect to the portion 22 without the necessity of having screw threads provided in aperture 25.

In use, the device is put in place by sliding the member 19 so that the slot surrounds stem 14 in that portion of stem 14 which is adjacent to where it passes through the aperture 17 in the rim. At the same time, the stem 14 is caused to pass through aperture 24. When the device 19 is slid into position as far as it will go, i.e., with the stem 14 at the most inward portion of slot 20, the wing nut 26 is screwed into speed nut 27 until its bottom end tightly presses against the stem 14. Since portion 19 of plate 15 has, in the region which surrounds stem 14, an area which is, of course, much greater than that of aperture 17 in rim 10, it is impossible for stem 14, together with plate 15 to be pulled through aperture 17. At the same time, it is impossible for stem 14 to become separated from plate 15 because of the positive fastening means comprising screw 26 which bears tightly upon stem 14.

The device of this invention has been shown as applied to a heavy-duty tire in which the stem makes an abrupt bend as it passes out through the rim 10. However, it will be apparent that the shape of plate 15 may readily be adapted to cause it to be equally effective with the type of tire having straight stem. Thus, if plate 15 is bent in the manner shown in FIGURE 3 and wing screw 26 securely tightened against stem 14, the plate 15 together with stem 14 cannot possibly be pushed through the aperture in the tire rim. Especially when this embodiment is used, it is not required that a slot be provided comparable to slot 20 in FIGURE 2; instead, it is then equally effective to provide another aperture in place of a slot.

The protective device of this invention has been shown as applied to a tire of the type having a separate inflatable tube. However, it will be understood that it is equally applicable to so-called tubeless tires. Having described one specific embodiment of this invention, it is further to be understood that various other modifications, adaptations, and alterations may be made to the specific form shown without in any manner departing from the spirit or scope of this invention.

What I claim is:

1. Apparatus for protecting a tire by preventing withdrawal of the valve stem through an aperture in the rim and into the interior of the tire casing and comprising, a rigid plate having an open ended slot in one end thereof to receive said stem and being adapted to lie flat against the rim in the vicinity of said aperture, a substantially flat central body portion for said plate extending generally parallel to said stem and terminating near the valve end of said stem, an integral bent-over portion of said plate which at least partially encircles said stem near the valve end thereof, and fastening means threadably engaging said bent-over portion and being adapted to bear tightly against said stem and thereby force said stem against said bent-over portion which at least partially encircles said stem.

2. The invention as defined in claim 1 wherein said bent-over end portion defines an aperture which encircles said stem and also comprises a substantially flat portion which lies substantially parallel to the axis of said stem, said fastening means passing through a further aperture defined in said last-named flat portion and being threadably engaged relative thereto so that its end bears gainst said stem and forces said stem tightly against a side wall of said aperture.

3. The invention as defined in claim 2 wherein said fastening means comprises a screw and a speed nut of the type having threaded apertures in each of two planar surfaces which lie respectively above and below said last-named flat portion.

References Cited in the file of this patent

UNITED STATES PATENTS

| | | |
|---|---|---|
| 1,192,112 | Porter | July 25, 1916 |
| 2,334,801 | Zimmerman | Nov. 23, 1943 |
| 2,984,283 | Ransom | May 16, 1961 |
| 3,039,510 | Cardi | June 19, 1962 |